US012248257B2

(12) United States Patent
Ninomiya

(10) Patent No.: US 12,248,257 B2
(45) Date of Patent: Mar. 11, 2025

(54) DEVELOPING APPARATUS HAVING A SEALED DEVELOPER OPENING

(71) Applicant: CANON KABUSHIKI KAISHA, Tokyo (JP)

(72) Inventor: Takashi Ninomiya, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/709,507

(22) Filed: Mar. 31, 2022

(65) Prior Publication Data

US 2022/0221812 A1 Jul. 14, 2022

Related U.S. Application Data

(62) Division of application No. 16/274,376, filed on Feb. 13, 2019, now Pat. No. 11,415,910.

(30) Foreign Application Priority Data

Feb. 26, 2018 (JP) ................................ 2018-032050

(51) Int. Cl.
*G03G 15/08* (2006.01)

(52) U.S. Cl.
CPC ..... *G03G 15/0882* (2013.01); *G03G 15/0891* (2013.01); *G03G 15/0894* (2013.01); *G03G 2215/0687* (2013.01)

(58) Field of Classification Search
CPC ........... G03G 15/0882; G03G 15/0896; G03G 15/0891; G03G 2215/0687
See application file for complete search history.

(56) References Cited

U.S. PATENT DOCUMENTS 4,615,608 A * 10/1986 Mizutani ............ G03G 15/0855
222/DIG. 1
5,153,650 A 10/1992 Maeshima
(Continued)

FOREIGN PATENT DOCUMENTS

EP 3709091 A1 * 9/2020 ......... G03G 15/0808
JP H01-057765 U 4/1989
(Continued)

OTHER PUBLICATIONS

Japanese Office Action dated Mar. 23, 2021, in related Japanese Patent Application No. 2020-021762.
(Continued)

*Primary Examiner* — Arlene Heredia
(74) *Attorney, Agent, or Firm* — VENABLE LLP

(57) ABSTRACT

A developing apparatus includes a sealing sheet to seal an opening portion in a developing container, an attaching portion provided on an accommodating chamber and to which the sealing sheet is attached, and a discharge portion through which the sealing sheet is discharged from inside of the developer container to outside of the developer container. The initial developer in the accommodating chamber moves to a second chamber through the opening portion by discharging the sealing sheet through the discharge portion from the inside of the developer container to the outside of the developer container. The discharge portion is disposed upstream from the opening portion and above the opening portion, and the discharge portion is disposed on a wall surface of the developer container intersected with a side wall of the developer container, the side wall having a through hole which a second conveyance screw penetrates.

7 Claims, 8 Drawing Sheets

(56) References Cited

U.S. PATENT DOCUMENTS

| | | | | | |
|---|---|---|---|---|---|
| 5,650,841 | A | * | 7/1997 | Matsuda | G03G 15/0882 399/105 |
| 5,778,282 | A | | 7/1998 | Nagashima | |
| 6,097,907 | A | | 8/2000 | Fujiwara | |
| 6,463,242 | B1 | * | 10/2002 | Kojima | G03G 15/0882 399/119 |
| 6,484,000 | B1 | | 11/2002 | Ogawa et al. | |
| 7,769,317 | B2 | | 8/2010 | Ito | |
| 8,023,858 | B2 | | 9/2011 | Shinoda | |
| 8,965,243 | B2 | | 2/2015 | Hayashida | |
| 9,568,857 | B1 | | 2/2017 | Yoshioka | |
| 10,401,757 | B2 | | 9/2019 | Ninomiya | |
| 10,866,536 | B2 | | 12/2020 | Kuwata et al. | |
| 2011/0085820 | A1 | | 4/2011 | Choi et al. | |
| 2011/0123229 | A1 | | 5/2011 | Takashima et al. | |

FOREIGN PATENT DOCUMENTS

| | | | | | |
|---|---|---|---|---|---|
| JP | H04-009886 | A | | 1/1992 | |
| JP | 2000-035711 | A | | 2/2000 | |
| JP | 2000075622 | A | * | 3/2000 | G03G 15/0875 |
| JP | 2004-126182 | A | | 4/2004 | |
| JP | 2006-171539 | A | | 6/2006 | |
| JP | 2007-298871 | A | | 11/2007 | |
| JP | 2010-048944 | A | | 3/2010 | |
| JP | 2013-242512 | A | | 12/2013 | |
| JP | 2015-025857 | A | | 2/2015 | |
| JP | 6579914 | B2 | * | 9/2019 | G03G 15/0865 |

OTHER PUBLICATIONS

Japanese Office Action dated Jul. 9, 2019, in related Japanese Patent Application No. 2018-032050.

* cited by examiner

DEVELOPING APPARATUS HAVING A SEALED DEVELOPER OPENING

This application is a divisional of application Ser. No. 16/274,376, filed Feb. 13, 2019.

BACKGROUND OF THE INVENTION

Field of the Invention

The present invention relates to a developing apparatus preferably adopted in image forming apparatuses utilizing electrophotography technique, such as a printer, a copying machine, a facsimile or a multifunction printer.

Description of the Related Art

Image forming apparatuses that adopt electrophotography technique, such as printers, copying machines, facsimiles or multifunction printers, are equipped with a developing apparatus that develops and visualizes electrostatic latent images formed on photosensitive drums and that is attached to an apparatus body in a detachable manner. A developing apparatus for replacement includes new developer stored in advance in a storage portion having an opening portion thereof sealed by a sealing sheet so as to prevent new developer from being exposed to outer air and deteriorated. Therefore, if the developing apparatus for replacement is attached, the sealing sheet must be drawn out to open the storage portion and enable developer to flow out of the storage portion. A conveyance screw capable of conveying developer flown out of the storage portion is disposed in the developer container, and the sealing sheet is drawn out toward a rotation axis direction of the conveyance screw. In the developer container, a sheet discharge port that enables the sealing sheet to be drawn out approximately in parallel and enables the sealing sheet being drawn out to be discharged outside the developer container is formed on a lower side closer to the conveyance screw than the opening portion or on an extended line of the opening portion of the storage portion (Japanese Patent Application Laid-Open Publication No. 2010-48944).

If the conveyance screw is rotated after the sealing sheet is drawn out, developer scatters in the developer container by the rotation of the conveyance screw and scattered developer tends to be discharged easily through the sheet discharge port to the outer side of the developer container. One conceivable method for preventing this problem relates to arranging the sheet discharge port away from the conveyance screw in a rotational axis direction of the conveyance screw, but such arrangement leads to increasing the size of the apparatus, and therefore not easily adopted. Another conceivable method relates to sealing the sheet discharge port with a sealing member formed of an elastic member and enhancing elasticity of the sealing member. However, in such case, force that is required to draw out the sealing sheet becomes too strong, and in some cases, the sealing sheet breaks while being drawn out and the developing apparatus must be replaced again, so that it was difficult to adopt such arrangement. In consideration of these problems, there was a demand for a developing apparatus adopting a configuration where developer is stored in advance in a storage portion sealed by a sealing sheet, wherein developer is prevented from being discharged easily through the sheet discharge port to an outer side of the developer container by the rotation of the conveyance screw after the sealing sheet has been drawn out from the developing apparatus. However, there has not been any proposal of such arrangement.

In consideration of the above problems, the present invention provides a developing apparatus that adopts a configuration where developer is stored in advance in a storage portion sealed by a sealing sheet, wherein developer is not easily discharged to the outer side of the developer container by the rotation of the conveyance screw through the sheet discharge port after the sealing sheet has been drawn out.

SUMMARY OF THE INVENTION

According to one aspect of the present invention, a developing apparatus includes a developer container configured to store developer, a conveyance screw disposed in the developer container and configured to convey developer in the developer container, a wall portion dividing a space above the conveyance screw in the developer container in a rotational axis direction of the conveyance screw and forming a first chamber and a second chamber respectively comprising an opening portion that is opened to a conveyance screw side, and a sheet member sealing an opening portion of the first chamber in a state where developer is stored in the first chamber, the sheet member configured to be peeled off from the opening portion of the first chamber. The second chamber comprises a sheet discharge port that communicates the second chamber and an outer side of the developer container, a portion of the sheet member reaching the outer side of the developer container through the sheet discharge port in a state sealing the opening portion of the first chamber. The sheet discharge port is arranged above the opening portion of the first chamber.

Further features of the present invention will become apparent from the following description of exemplary embodiments with reference to the attached drawings.

DESCRIPTION OF THE EMBODIMENTS

First Embodiment

Image Forming Apparatus

Figure 1:
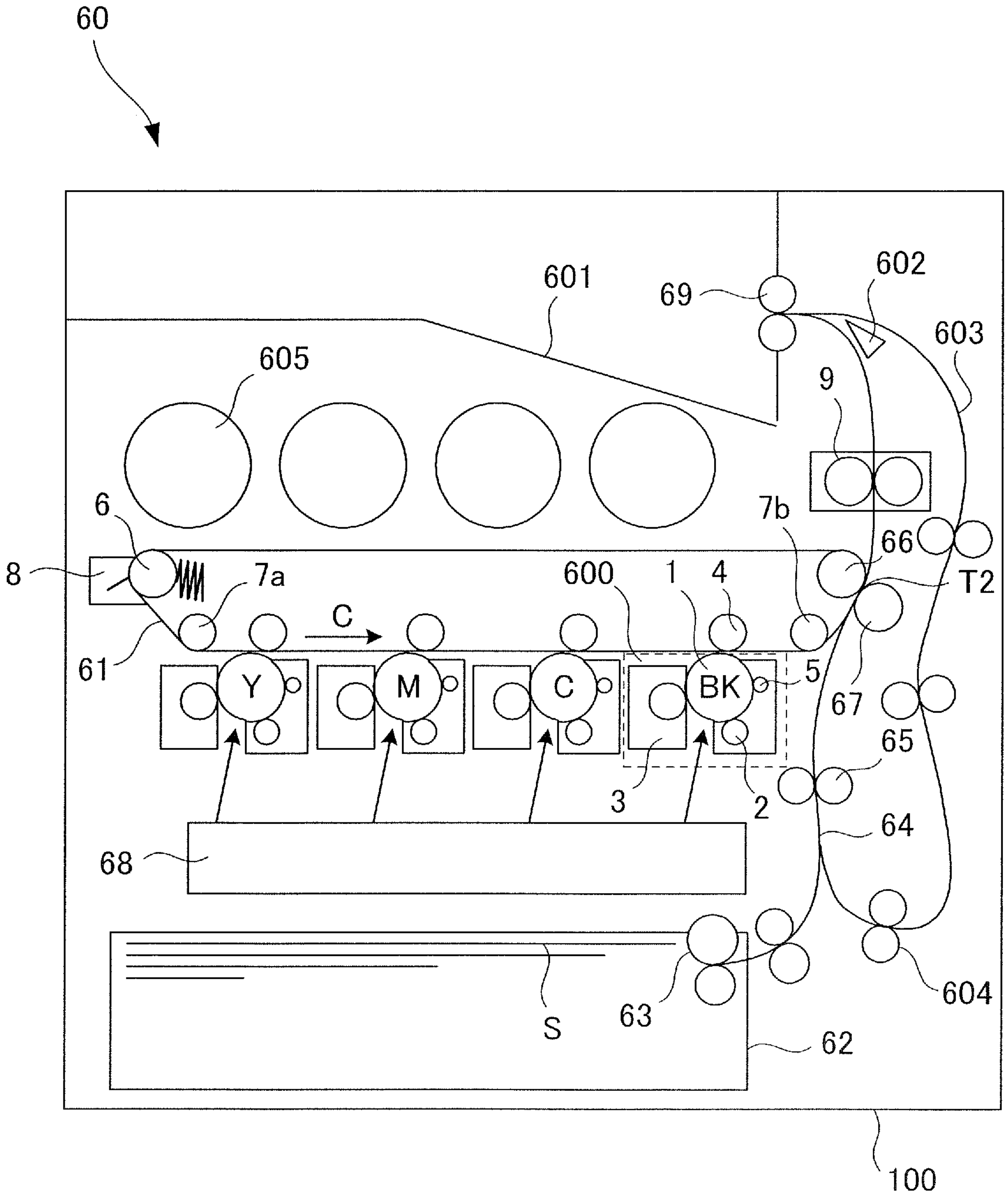
FIG. 1 is a schematic view illustrating a configuration of an image forming apparatus that is suitable for adopting a developing apparatus according to a first embodiment.

Now, a first embodiment will be described. At first, a configuration of an image forming apparatus suitable for adopting a developing apparatus according to the present embodiment will be described with reference to FIG. 1. An image forming apparatus 60 illustrated in FIG. 1 is a color image forming apparatus adopting a tandem-type intermediate transfer system in which image forming units 600 corresponding to four colors are arranged to oppose to an intermediate transfer belt 61 within an apparatus body 100.

A conveyance process of a recording material of the image forming apparatus 60 will be described. A recording material S is stored in a manner stacked in a recording material storage, i.e., cassette, 62, and the recording material S is fed at a matched timing with an image forming timing by a sheet feed roller 63. Feeding of sheets from the cassette 62 can utilize a friction separation system, for example. The recording material S sent out from the sheet feed roller 63 is conveyed to a registration roller 65 arranged in midway of a conveyance path 64. After performing skew correction and timing correction of the recording material S at the registration roller 65, the recording material S is sent to a secondary transfer portion T2. The secondary transfer portion T2 is a transfer nip portion formed by a secondary transfer inner roller 66 and a secondary transfer outer roller 67 that are opposed to one another, and the secondary transfer portion T2 applies predetermined pressure and electrostatic load bias to attach a toner image to the recording material S.

Regarding the conveyance process of the recording material S to the secondary transfer portion T2 described above, a process for forming an image sent to the secondary transfer portion T2 at a similar timing will be described. At first, image forming units 600 will be described. The image forming units 600 of respective colors basically have the same configurations except for the color of the toner, so that in FIG. 1, only the image forming unit 600 of black (BK) is denoted with reference numbers, and other image forming units are not denoted with reference numbers. Therefore, in the following description, the image forming unit 600 of black (BK) is illustrated as an example.

The image forming unit 600 is mainly composed of a photosensitive drum 1, a charging unit 2, a developing apparatus 3, a photosensitive drum cleaner 5 and so on. The surface of the photosensitive drum 1 driven to rotate is charged uniformly in advance by the charging unit 2, and thereafter, an electrostatic latent image is formed by an exposing unit 68 that is driven based on an image information signal. Next, the electrostatic latent image formed on the photosensitive drum 1 is visualized by development of toner image by the developing apparatus 3. That is, the developing apparatus 3 develops the electrostatic latent image using toner included in developer described later and forms a toner image on the photosensitive drum 1. The developing apparatus 3 will be described later (refer to FIG. 2).

Thereafter, predetermined pressure and electrostatic load bias is applied by primary transfer apparatuses 4 arranged opposed to the image forming units 600 with the intermediate transfer belt 61 intervened, and toner image formed on the photosensitive drum 1 is primarily transferred to the intermediate transfer belt 61. Primary transfer residual toner remaining on the photosensitive drum 1 after primary transfer is recovered by the photosensitive drum cleaner 5, and the apparatuses prepare for the next image forming process.

According to the present embodiment, four sets of image forming units 600 corresponding to yellow (Y), magenta (M), cyan (C) and black (BK) are provided. However, the number of colors is not restricted to four, and the order in which the colors are arranged is not restricted to this example. The developing apparatus 3 uses two-component developer including nonmagnetic toner and magnetic carrier as developer. Since toner is consumed by development, toner can be replenished to the developing apparatus 3 from a toner bottle 605 storing toner.

The intermediate transfer belt 61 onto which toner image is primarily transferred is an endless belt that is stretched across a tension roller 6, the secondary transfer inner roller 66 and driven rollers 7*a* and 7*b* and moved toward the direction of arrow C in the drawing. In the present embodiment, the secondary transfer inner roller 66 also functions as a drive roller that drives the intermediate transfer belt 61. The image forming process of respective colors subjected to parallel processing by the image forming units 600 of respective colors mentioned above is performed at a timing for sequentially superposing the toner image on a different colored toner image primarily transferred to the intermediate transfer belt 61 upstream in the direction of movement. As a result, a full-color toner image is finally formed on the intermediate transfer belt 61 and conveyed to the secondary transfer portion T2. The secondary transfer residual toner remaining on the intermediate transfer belt 61 after passing the secondary transfer portion T2 is collected from the intermediate transfer belt 61 by a transfer cleaner device 8.

As described, by the conveyance process and the image forming process described above, the timings of the recording material S and the full-color toner image correspond at the secondary transfer portion T2, and secondary transfer where the toner image is transferred from the intermediate transfer belt 61 to the recording material S is performed. Thereafter, the recording material S is conveyed to a fixing unit 9, where heat and pressure is applied by the fixing unit 9, and thereby, toner image is melted and fixed to the recording material S. The recording material S to which image has been fixed is selected to be either discharged onto a sheet discharge tray 601 by rotation of the sheet discharge roller 69 in a forward direction or subjected to duplex image forming.

If duplex image forming is necessary, after conveying the recording material S such that a trailing edge of the recording material S passes a switching member 602 by rotation of the sheet discharge roller 69 in the forward direction, the sheet discharge roller 69 is rotated in reverse rotation to switch a leading edge and a trailing edge of the recording material S, and then the recording material S is conveyed to a duplex conveyance path 603. Thereafter, at a matched timing with the recording material for a subsequent job conveyed from the sheet feed roller 63, the recording material S is sent again to the conveyance path 64 by a sheet refeeding roller 604. The conveyance and image forming processes performed thereafter are similar to the processes described earlier, so that the descriptions thereof are omitted.

Developing Unit

Figure 2:
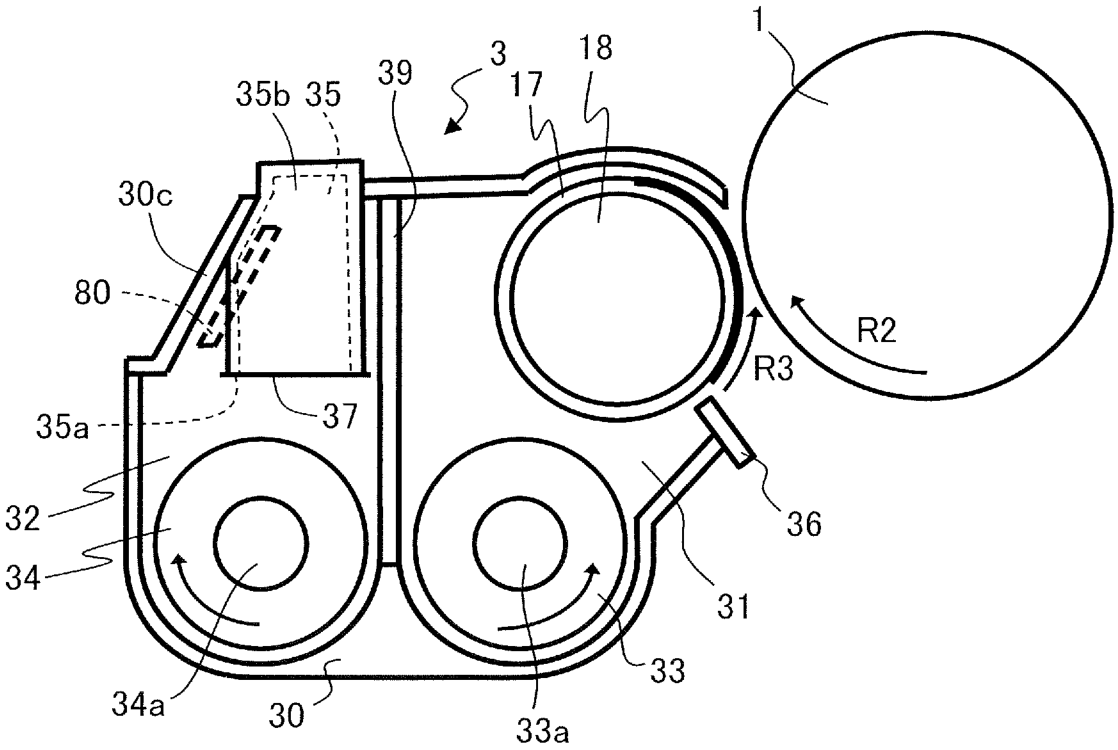
FIG. 2 is a cross-sectional view illustrating a developing apparatus according to the first embodiment.

Next, the developing apparatus 3 according to the first embodiment will be described based on FIGS. 2 and 4 with reference to FIG. 1. In FIG. 2, in order to help understand the present embodiment, a sheet discharge port 80 described later is illustrated by dotted lines. The developing apparatus 3 according to the present embodiment includes, as illustrated in FIG. 2, a developer container 30 forming a housing, a developing sleeve 17, a developing screw 33 and an agitating screw 34, and a regulating blade 36.

Two-component developer including nonmagnetic toner and magnetic carrier, hereinafter simply referred to as developer, is stored in the developer container 30. That is, the developing apparatus 3 of the present embodiment adopts a two-component developing system as developing system and uses developer in which nonmagnetic toner having negative charge polarity and magnetic carrier having positive charge polarity are mixed. Nonmagnetic toner is formed by including coloring agent, external additive such as colloidal silica fine powder or wax in resin such as polyester or styrene acryl and powdering by pulverization or polymerization. Magnetic carrier is formed by applying resin coating on a surface of cores formed of ferrite particles or resin particles kneaded with magnetic powder. Toner density, that is, ratio of toner weight with respect to total weight of toner and carrier, of a new developer in a so-called initial state is 10%, for example.

The developer container 30 has one portion opposed to the photosensitive drum 1 opened, and a developing sleeve 17 capable of bearing developer is rotatably arranged in the developer container 30 to be partially exposed from the opening. The developing sleeve 17 serving as a developer bearing member is formed into a cylindrical shape using nonmagnetic material such as aluminum and stainless steel and rotated in a same direction as the photosensitive drum 1 at a surface opposed to the photosensitive drum 1 (refer to arrows R2 and R3 in the drawing). The direction of rotation of the developing sleeve 17 may also be opposite to the direction of the photosensitive drum 1 at the surface opposed to the photosensitive drum 1.

A magnet roller 18 is arranged on an inner side of the developing sleeve 17 and fixed thereto. A magnetic brush of developer is formed on the surface of the developing sleeve 17 by magnetic force of the magnet roller 18. The magnetic brush formed on a surface of the developing sleeve 17 has its layer thickness regulated by the regulating blade 36 and is sent to a predetermined developing area. The regulating blade 36 is a plate-like member formed of nonmagnetic material such as aluminum, and it is disposed along a rotational axis direction, i.e., longitudinal direction, of the developing sleeve 17. In a state where the magnetic brushes moved to the developing area brush against the photosensitive drum 1, the electrostatic latent image formed on the photosensitive drum 1 is developed as toner image. In this state, either DC voltage or superposed voltage in which DC voltage and AC voltage are superposed is applied as developing voltage from a power supply not shown to the developing sleeve 17.

The developer container 30 is divided into a developing chamber 31 and an agitating chamber 32 by a partition wall 39 that is arranged to extend in a vertical direction in the drawing at approximately a center portion thereof. The developing chamber 31 and the agitating chamber 32 are communicated through communication portions that are arranged at both ends in a longitudinal direction of the partition wall 39, by which a circulation path of developer is formed. The developing screw 33 is disposed rotatably on the developing chamber 31 and the agitating screw 34 is disposed rotatably on the agitating chamber 32. The developing screw 33 and the agitating screw 34 are screws respectively having vanes not shown disposed helically around rotation shafts 33*a* and 34*a*.

The developing sleeve 17, the developing screw 33 and the agitating screw 34 mentioned above are connected via a gear train and are rotated by a drive motor not shown via the gear train. In a state where the developing screw 33 rotates, developer in the developing chamber 31 is conveyed along the developing screw 33, during which a portion of the developer is supplied to the developing sleeve 17. Developer conveyed in the developing chamber 31 is transferred from the developing chamber 31 to the agitating chamber 32 via a communication portion on a first end side of the partition wall 39 at a downstream side in a developer conveyance direction of the developing screw 33. Meanwhile, if the agitating screw 34 rotates, developer in the agitating chamber 32 is conveyed to an opposite direction as the developer conveyance direction of the developing screw 33 along the agitating screw 34. Developer conveyed in the agitating chamber 32 is transferred from the agitating chamber 32 to the developing chamber 31 through a communication portion on a second end side of the partition wall 39 at an upstream side in the developer conveyance direction of the developing screw 33. In this manner, developer is conveyed in circulation in the developer container 30 while being agitated by the developing screw 33 and the agitating screw 34.

Storage Portion and Sealing Sheet

In order to improve convenience, the developing apparatuses 3 of respective colors are detachably attached to the apparatus body 100 (refer to FIG. 1) according to the present embodiment. In the developing apparatus 3 for replacement, developer in a new state that is not yet used for developing images, also referred to as initial state, is sealed in advance in the developer container 30 so that it is not exposed to air and deteriorated. In the present embodiment, as illustrated in FIG. 2, a storage portion 35 capable of storing new developer in advance is formed above the agitating screw 34 serving as the conveyance screw in the developer container 30.

Figure 3:
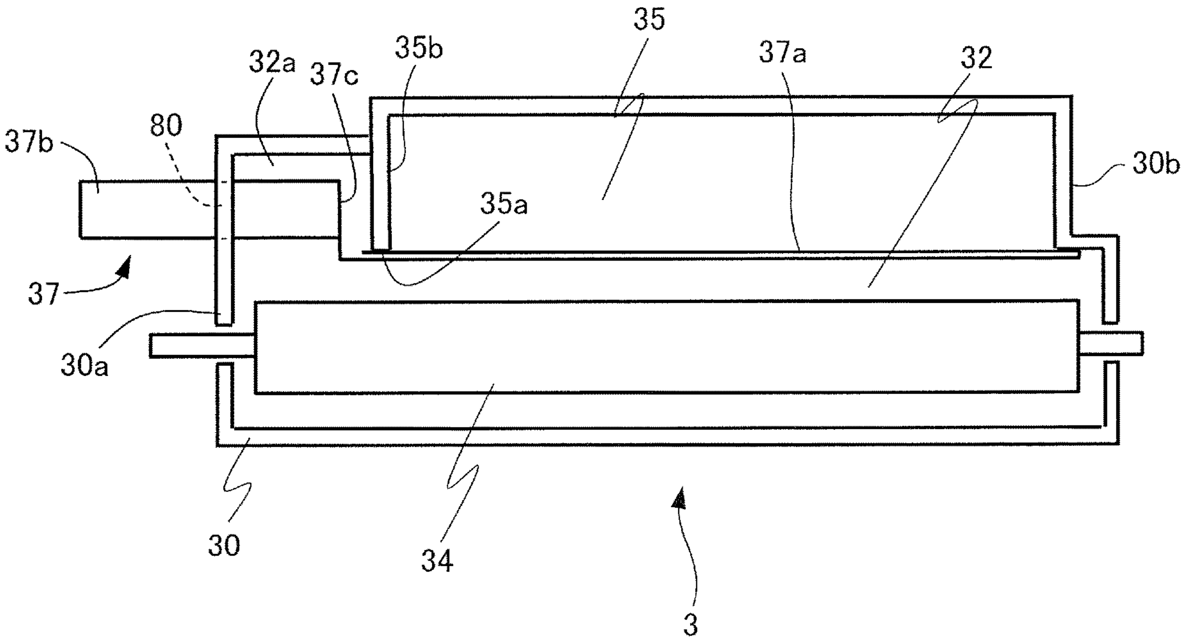
FIG. 3 is a cross-sectional view illustrating the developing apparatus according to the first embodiment taken at a vertical cross-section along an axial direction.
Figure 4:
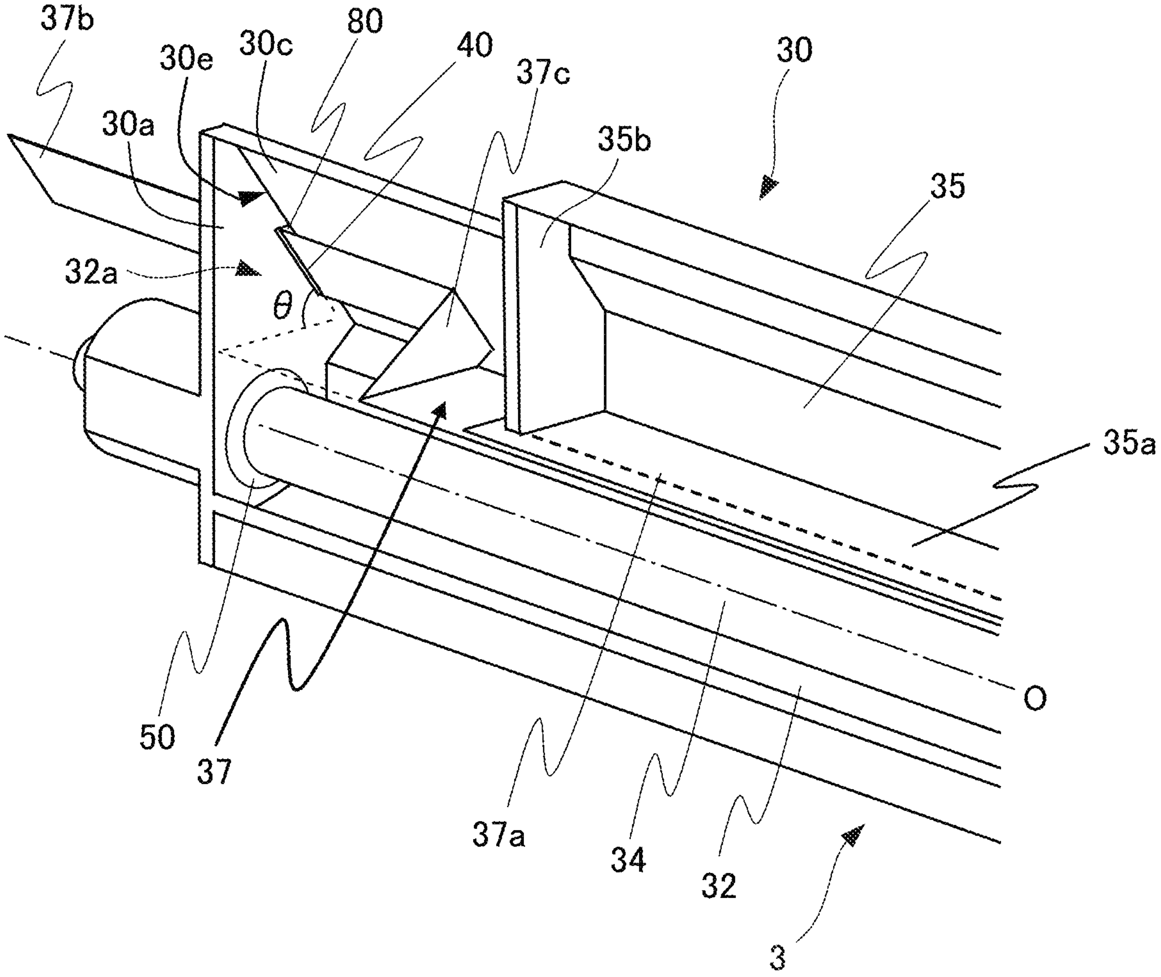
FIG. 4 is a cross-sectional perspective view illustrating in enlarged view a vicinity of a sheet discharge port of the developing apparatus according to the first embodiment.

The storage portion 35 serving as a first chamber is formed by dividing a space above the agitating screw 34 in the developer container 30 in the rotational axis direction, i.e., longitudinal direction, of the agitating screw 34 by a wall portion 35*b*, as illustrated in FIGS. 3 and 4. In addition to the storage portion 35, the wall portion 35*b* defines a space portion 32*a* serving as a second chamber. In other words, the developing apparatus 3 includes the storage portion 35 and the space portion 32*a* formed by dividing a space above the agitating screw 34 in the developer container 30 by the wall portion 35*b* in the horizontal direction in a state where the developer container 30 is attached to the image forming apparatus 60. The storage portion 35 and the space portion 32*a* are arranged adjacent one another in a rotational axis direction of the agitating screw 34. In the present embodiment, the storage portion 35 and the space portion 32*a* are opened toward the agitating screw 34 and are communicated with the agitating chamber 32. That is, both the storage portion 35 and the space portion 32*a* have opening portions that are opened downward. Preferably, the storage portion 35 is formed to approximately cover the whole area in which the blade (not shown) of the agitating screw 34 is formed with respect to the rotational axis direction of the agitating screw 34, so that the developer is conveyed efficiently after a sealing sheet 37 described later is drawn out.

The sealing sheet 37 can be adhered onto an opening portion 35*a* of the storage portion 35, and the sealing sheet 37 is capable of sealing the opening portion 35*a* in a state where developer is stored in the storage portion 35. The sealing sheet 37 is a sheet member formed of a resin material such as a plastic film, for example, and it is adhered to the opening portion 35*a* by an appropriate method, such as heat sealing or using adhesive agent, so that it can be peeled off from the opening portion 35*a*. As described, the storage portion 35 can be sealed by the sealing sheet 37 in a state where new developer is stored therein. That is, the sealing sheet 37 can seal the opening portion 35*a* when developer is stored in the storage portion 35 and be peeled off from the opening portion 35*a*.

The developing apparatus 3 for replacement stores new developer in advance in the storage portion 35 sealed by the sealing sheet 37 as described, and no developer is stored in the developing chamber 31 and the agitating chamber 32 including the space portion 32*a*. Therefore, in a state where the developing apparatus 3 for replacement is attached, the sealing sheet 37 must be removed. If the sealing sheet 37 is removed, developer stored in the storage portion 35 drops into the agitating chamber 32 including the agitating screw 34 and is conveyed by the rotation of the agitating screw 34 and the developing screw 33, such that new developer is delivered throughout the developer container 30. In the present embodiment, the sealing sheet 37 is configured to be drawn out in the rotational axis direction, i.e., longitudinal direction, of the agitating screw 34 from the outer side of the developer container 30.

As illustrated in FIG. 4, a sheet discharge port 80 is formed on the developer container 30 so as to enable the sealing sheet 37 to be drawn out in the longitudinal direction. That is, the space portion 32*a* includes the sheet discharge port 80 that communicates the space portion 32*a* with the outer side of the developer container 30. In the present embodiment, the sheet discharge port 80 is formed on an end wall 30*a* of the developer container 30 having a bearing portion 50 for rotatably supporting the agitating screw 34 so as to enable the sealing sheet 37 to be drawn out along the rotational axis direction of the agitating screw 34. Specifically, the sheet discharge port 80 is formed on the end wall 30*a* opposite to the wall portion 35*b* interposing the space portion 32*a*. That is, the sheet discharge port 80 is formed on the end wall 30*a* of the space portion 32*a* opposed to the wall portion 35*b* with respect to the rotational axis direction.

A first end side of the sealing sheet 37 that is not adhered to the opening portion 35*a* is inserted to the sheet discharge port 80 so that the first end side, i.e., free end portion 37*b* described later, projects out of the developer container 30. A portion of the sealing sheet 37 reaches the outer side of the developer container 30 through the sheet discharge port 80 in a state where the sealing sheet 37 seals the opening portion 35*a* of the storage portion 35. Since the first end side of the sealing sheet 37 is projected to the outer side of the developer container 30 through the sheet discharge port 80, the sealing sheet 37 can be drawn out from outside the developer container 30. Thereby, in a state where the sealing sheet 37 is drawn out, the sealing sheet 37 is discharged to the outer side of the developer container 30 while being guided by the sheet discharge port 80.

According to the present embodiment, the sheet discharge port 80 is formed above the opening portion 35*a* when viewed from the horizontal direction. As described, the sheet discharge port 80 is separated from the agitating screw 34 with respect to a radial direction of the agitating screw 34, and therefore, developer will not be easily discharged by the rotation of the agitating screw 34 to the outer side of the developer container 30 through the sheet discharge port 80 after the sealing sheet 37 has been drawn out.

The sheet discharge port 80 is an opening having a long hole shape, and it is formed such that a longitudinal direction of the long hole shape is inclined at a predetermined angle with respect to a horizontal direction. The predetermined angle (refer to an angle in FIG. 4) should preferably be 30 degrees or greater and smaller than 90 degrees with respect to the horizontal direction, and more preferably, 45 degrees, since if the angle is too great, the tension applied while drawing out the sealing sheet 37 may be too high. By inclining the sheet discharge port 80, the upper end side of the sheet discharge port 80 will be more separated from the agitating screw 34 than the lower end side with respect to the radial direction of the agitating screw 34. Then, compared to the case where the sheet discharge port 80 is not inclined (0=0), developer is not easily discharged by the rotation of the agitating screw 34 to the outer side of the developer container 30 through the sheet discharge port 80 after the sealing sheet 37 has been drawn out.

Further, as illustrated in FIGS. 2 and 4, in a state where a wall surface 30*c* of the developer container 30 on an opposite side from the developing sleeve 17 in a width direction intersecting the rotational axis direction of the agitating screw 34 is formed to be inclined with respect to the vertical direction, the sheet discharge port 80 can be inclined along the inclination of the wall surface 30*c*. That is, the sheet discharge port 80 can be inclined at a same angle of inclination as the wall surface 30*c* with respect to the vertical direction. The sheet discharge port 80 is arranged such that the longitudinal direction of the long hole shape thereof is arranged along an edge portion 30*e* on an end wall side of the wall surface 30*c* of the side wall. In this case, at least a portion of the sheet discharge port 80 may be formed to overlap with the wall portion 35*b* when viewed from the rotational axis direction of the agitating screw 34. According to this arrangement, it becomes possible to prevent developer from being easily discharged by the rotation of the agitating screw 34 to the outer side of the developer container 30 through the sheet discharge port 80 after the sealing sheet 37 has been drawn out, without having to increase the size of the apparatus.

The sealing sheet 37 adhered to the opening portion 35*a* is bent, as illustrated in FIG. 4, and projected to the outer side of the developer container 30 through the sheet discharge port 80. That is, in a state where the sealing sheet 37 seals the opening portion 35*a* of the storage portion 35, a sealing portion 37*a* that seals the opening portion 35*a* and a free end portion 37*h* that is projected to the outer side of the developer container 30 from the sheet discharge port 80 are connected by a bent portion 37*c* bent in the space portion 32*a*. The bent portion 37*c* serves to change the positions where the sealing portion 37*a* and the free end portion 37*b* are extended in the space portion 32*a*, such that force by which the sealing portion 37*a* is drawn out is transmitted appropriately from the free end portion 37*b* during draw out operation to thereby enable the sealing sheet 37 to be easily discharged through the sheet discharge port 80. If the sheet discharge port 80 is formed above the opening portion 35*a* when viewed from the horizontal direction, the sealing sheet 37 must be bent. Therefore, according to the present embodiment, the storage portion 35 and the space portion 32*a* are defined by the wall portion 35*b* so as to ensure the space portion 32*a* in which the bent portion 37*c* described above is stored. In other words, by ensuring the space portion 32*a* by the wall portion 35*b*, it becomes possible to form the sheet discharge port 80 above the opening portion 35*a* when viewed from the horizontal direction.

A sealing member 40 formed of an elastic member such as urethane material can be arranged in the sheet discharge port 80, as illustrated in FIG. 4. The sealing member 40 is arranged to fill the gap of the sheet discharge port 80 while the sealing member 40 interposes the sealing sheet 37 in a manner capable of passing through the sheet discharge port 80. The sealing member 40 is an elastic member capable of interposing the sealing sheet 37 to allow the sealing sheet 37 to pass therethrough and also capable of sealing the sheet discharge port 80 after the sealing sheet 37 has been drawn out of the developer container 30 through the sheet discharge port 80.

As described, according to the present embodiment, the sheet discharge port 80 is formed above the opening portion 35*a* when viewed from the horizontal direction to thereby separate the sheet discharge port 80 from the agitating screw 34 in the radial direction of the agitating screw 34. Further, by inclining the sheet discharge port 80 by a predetermined angle with respect to the horizontal direction, the sheet discharge port 80 can be separated from the agitating screw 34 in the radial direction of the agitating screw 34. Thus, it becomes possible to easily realize an arrangement where developer is not easily discharged by the rotation of the agitating screw 34 to the outer side of the developer container 30 through the sheet discharge port 80 after the sealing sheet 37 has been drawn out.

Second Embodiment

Figure 5:
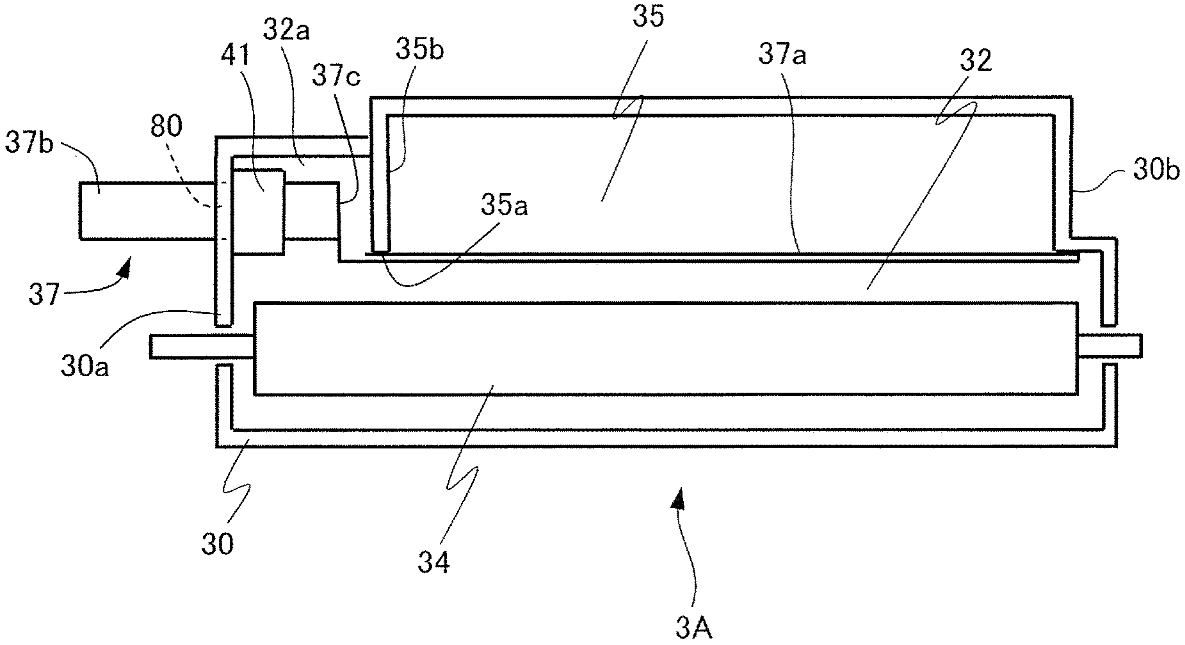
FIG. 5 is a cross-sectional view illustrating a developing apparatus of a second embodiment taken at a vertical cross-section along an axial direction.
Figure 6:
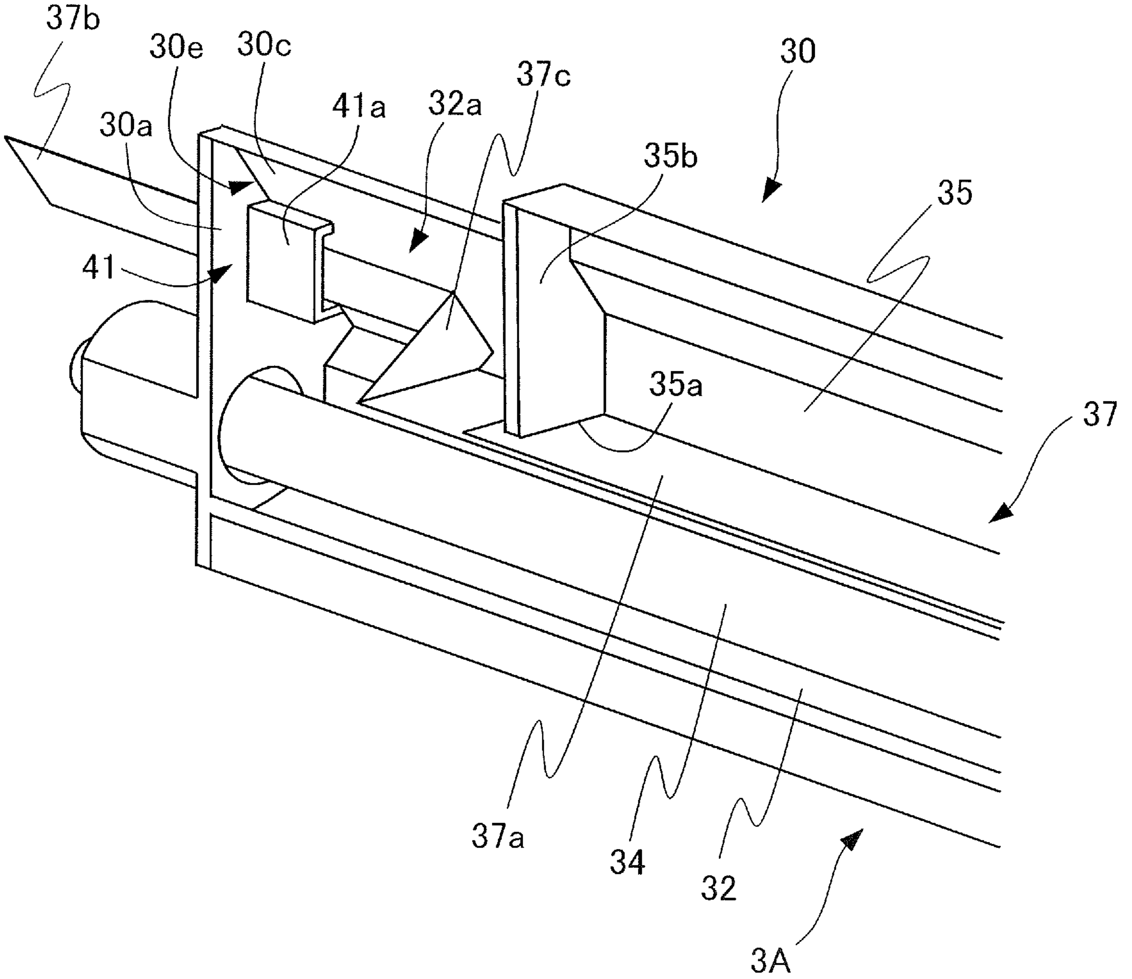
FIG. 6 is a cross-sectional perspective view illustrating in enlarged view a vicinity of a sheet discharge port of the developing apparatus according to the second embodiment.

A developing apparatus 3A according to a second embodiment will be described with reference to FIGS. 5 and 6. The developing apparatus 3A according to the second embodiment has a similar configuration as the developing apparatus 3 of the first embodiment described earlier (refer to FIGS. 3 and 4), except for the point that a discharge port wall 41 that is projected to the inner side of the developer container 30 is provided. Therefore, regarding the developing apparatus 3A of the second embodiment, the same configurations as the developing apparatus 3 of the first embodiment are assigned with the same reference numbers and descriptions thereof are omitted.

In the present embodiment, the discharge port wall 41 serving as a protruded portion arranged in a manner surrounding the sheet discharge port 80 is formed in the developer container 30. That is, the developer container 30 includes the discharge port wall 41 that is projected toward the inner side of the developer container 30 from the end wall 30*a* on which the sheet discharge port 80 is formed. The discharge port wall 41 enables the amount of developer scattered in the developer container 30 by the rotation of the agitating screw 34 after the sealing sheet 37 has been drawn out that flows into the sheet discharge port 80 to be reduced. According to this arrangement, the elasticity of the sealing member 40 (refer to FIG. 4) can be reduced, or even further, the sealing member 40 can be omitted. Then, the force required for drawing out the sealing sheet 37 can be reduced, and the problem of the sealing sheet 37 being broken when being drawn out from the developer container 30 can be reduced. Furthermore, the discharge port wall 41 includes a guide portion 41*a* that guides the sealing sheet 37 to the sheet discharge port 80 when the sealing sheet 37 is drawn out of the developer container 30 through the sheet discharge port 80. Thereby, the arrangement of the sealing sheet 37 with respect to the sheet discharge port 80 can be stabilized while drawing out the sealing sheet 37, so that even if the sheet discharge port 80 is inclined, the sealing sheet 37 will not be easily broken when being drawn out.

At least a portion of the discharge port wall 41 should be arranged below the sheet discharge port 80. However, it is more preferable to form the discharge port wall 41 in a manner surrounding the sheet discharge port 80 as according to the present embodiment, since developer is less likely to be discharged through the sheet discharge port 80.

Other Embodiments

The sealing sheet 37 can be drawn out by a user manually or by a removing device (not shown) configured to automatically wind the sealing sheet 37. In the removing device, a first end of the sealing sheet 37 is fixed to a winding shaft, and in a state where the winding shaft is rotated to wind the sealing sheet 37, the sealing sheet 37 is drawn to the outer side of the developer container 30. In a case where such removing device is used, the developing apparatus 3 will not be operated without drawing out the sealing sheet 37 and the sealing sheet 37 is collected in the developer unit 3 so that there is no need for the user to dispose the sealing sheet 37 having been drawn out of the developer container 30 as waste.

Figure 8:
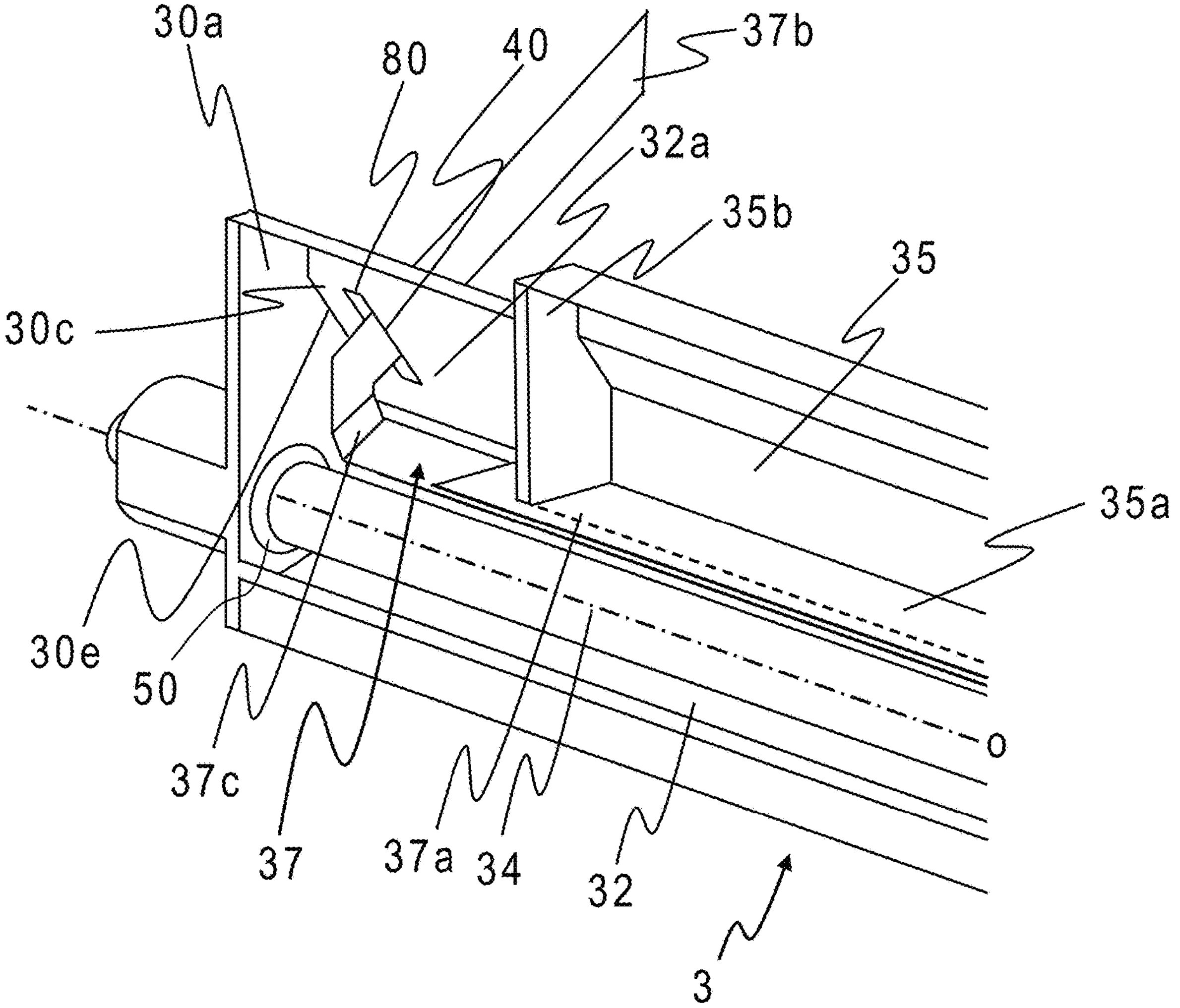
FIG. 8 is a cross-sectional perspective view illustrating in enlarged view a vicinity of a sheet discharge port of the developing apparatus according to another embodiment.

In the first and second embodiments described above, an example has been described where the sealing sheet 37 is drawn out in the rotational axis direction of the agitating screw 34, but the direction in which the sealing sheet 37 is drawn out is not restricted to this example. That is, the sheet discharge port 80 can be formed at a portion other than the end wall 30*a* of the developer container 30. For example, in a type of apparatus where the developing apparatuses 3 of respective colors are placed in parallel on a support base (not shown) drawn out from the apparatus body 100 and the plurality of developing apparatuses 3 are collectively attached together with the support base onto the apparatus body 100, the sealing sheet 37 should be drawn out after placing the new developing apparatus 3 on the support base. In this case, the sealing sheet 37 can be drawn out toward a radial direction of the agitating screw 34, instead of toward the rotational axis direction of the agitating screw 34. Therefore, the sheet discharge port 80 can be formed on the wall surface 30*c* (refer to FIG. 8) of the developer container 30, for example.

Figure 7:
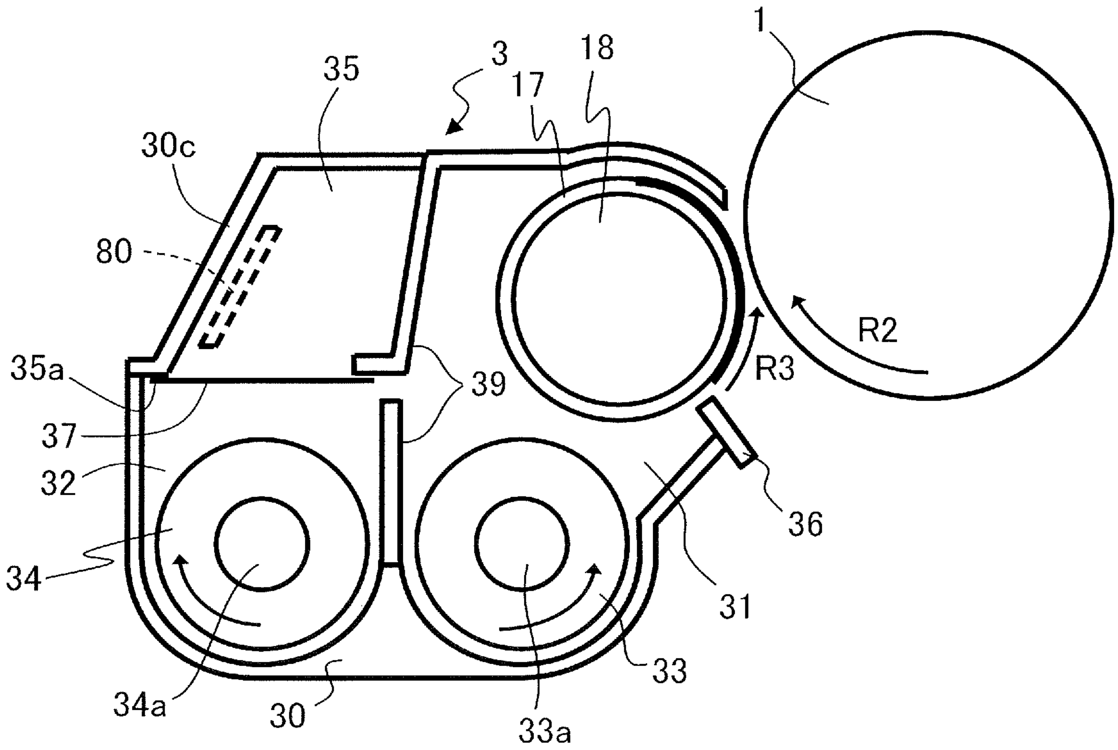
FIG. 7 is a cross-sectional view illustrating a developing apparatus according to another embodiment.

According to the first and second embodiments described above, as illustrated in FIG. 2, a case has been described where the side wall along the rotational axis direction of the storage portion 35 is disposed separately from the wall surface 30*c* and the partition wall 39 of the developer container 30, but the present invention is not restricted thereto. For example, as illustrated in FIG. 7, the side wall arranged along the rotational axis direction of the storage portion 35 can be formed of the same material as the wall surface 30*c* and the partition wall 39 of the developer container 30. Even according to this example, the sheet discharge port 80 is formed above the opening portion 35*a* in the horizontal direction, such that developer can be prevented from being easily discharged by the rotation of the agitating screw 34 to the outer side of the developer container 30 through the sheet discharge port 80 after the sealing sheet 37 has been drawn out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-032050, filed Feb. 26, 2018, which is hereby incorporated by reference herein in its entirety.

What is claimed is:

1. A developing apparatus comprising:

a rotatable developing member configured to carry and feed a developer containing toner and carrier toward a position for developing an electrostatic latent image formed on an image bearing member;

a developer container comprising:

a first chamber in which the rotatable developing member is disposed and which is configured to supply developer to the rotatable developing member;

a second chamber divided from the first chamber by a partition wall, with the developer being circulated between the first and second chambers; and an accommodating chamber disposed above the second chamber in a vertical direction, comprising an opening portion, and configured to accommodate initial developer;

a first conveyance screw disposed in the first chamber and configured to convey developer in a first direction;

a second conveyance screw disposed in the second chamber and configured to convey developer in a second direction opposite to the first direction;

a sealing sheet configured to seal the opening portion to accommodate the initial developer in the accommodating chamber;

an attaching portion provided on the accommodating chamber and to which the sealing sheet is attached; and a discharge port through which the sealing sheet is discharged from inside of the developer container to outside of the developer container, wherein the initial developer accommodated in the accommodating chamber is able to move from the accommodating chamber to the second chamber through the opening portion by discharging the sealing sheet attached to the attaching portion through the discharge port from the inside of the developer container to the outside of the developer container, wherein the second chamber includes a first wall portion and a second wall portion, the first wall portion including an end wall having a through hole which the second conveyance screw penetrates, the second wall portion including a wall surface which intersects with the end wall of the first wall portion, and wherein the opening portion is disposed inside the developer container from the discharge port with respect to a rotational axis direction of the second conveyance screw, wherein the discharge port is disposed above the opening portion in the vertical direction, and the discharge port is provided in the wall surface of the second wall portion so that when the sealing sheet attached to the attaching portion is discharged from the inside of the developer container to the outside of the developer container through the discharge port, the sealing sheet attached to the attaching portion passes through the discharge port in a direction along a radial direction of the second conveyance screw.

2. The developing apparatus according to claim 1, wherein the attaching portion is disposed on the accommodating chamber over a whole area in a longitudinal direction of the opening portion, and wherein the sealing sheet which is attached to the attaching portion seals the opening portion over the whole area in the longitudinal direction of the opening portion.

3. The developing apparatus according to claim 1, wherein a space portion is formed between a wall of the accommodating chamber and the end wall of the first wall portion in the rotation axis direction of the second conveyance screw, the space portion being provided above the second chamber in the vertical direction, and wherein the sealing sheet is attached to the attaching portion in a state that a free end portion of the sealing sheet is bent at the space portion.

4. The developing apparatus according to claim 1, further comprising a guide portion configured to guide the sealing sheet to the discharge port for discharging the sealing sheet attached to the attaching portion from the inside of the developer container to the outside of the developer container through the discharge port.

5. The developing apparatus according to claim 1, wherein a bearing portion configured to support the second conveyance screw rotatably is provided at the end wall of the first wall portion.

6. The developing apparatus according to claim 1, wherein a sealing member formed of an elastic member is provided at the discharge port.

7. The developing apparatus according to claim 6, wherein the elastic member is formed of urethane material.

* * * * *